(12) United States Patent
Sugiyama (10) Patent No.: US 6,490,321 B1
(45) Date of Patent: *Dec. 3, 2002

(54) APPARATUS AND METHOD OF ENCODING/DECODING MOVING PICTURE USING SECOND ENCODER/DECODER TO TRANSFORM PREDICTIVE ERROR SIGNAL FOR EACH FIELD

(75) Inventor: Kenji Sugiyama, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,757

(22) Filed: Mar. 19, 1999

(30) Foreign Application Priority Data

Mar. 19, 1998 (JP) .......................................... 10-091050

(51) Int. Cl.[7] .............................................. H04N 7/12
(52) U.S. Cl. .............................................. 375/240.13
(58) Field of Search ....................... 375/240.12, 240.15, 375/240.13; H04N 7/12

(56) References Cited

U.S. PATENT DOCUMENTS

| | | | |
|---|---|---|---|
| RE34,965 E | | 6/1995 | Sugiyama .................... 348/415 |
| 5,539,466 A | * | 7/1996 | Igarashi et al. ......... 375/240.15 |
| 5,619,273 A | | 4/1997 | Sugiyama .................... 348/452 |
| 5,666,461 A | * | 9/1997 | Igarashi et al. ......... 375/240.15 |
| 6,188,725 B1 | * | 2/2001 | Sugiyama .............. 375/240.12 |

FOREIGN PATENT DOCUMENTS

| | | |
|---|---|---|
| JP | 02192378 A | 7/1990 |
| JP | 11-45365 | 2/1999 |

* cited by examiner

*Primary Examiner*—Young Lee
(74) *Attorney, Agent, or Firm*—Jacobson Holman, PLLC (57) ABSTRACT

Progressively scanned specific frames that exist for every predetermined period in a moving picture signal is encoded by infra-frame processing or by uni-directional prediction using other encoded specific frames and by orthogonal transform at the $2^n$-th (n being an integer) order in the vertical direction, to produce a first bit stream. Frames or fields of the moving picture signal other than the specific frames are predicted by using a preceding reference frame and/or an upcoming reference frame, to produce a predictive error signal for each field. The predictive error signal is encoded by orthogonal transform at the $2^1$-th order in the vertical direction to produce a second bit stream. The first and second bit streams are alternatively stored in a storage medium. Specific frames that exist for every predetermined period in bit streams are decoded by inverse orthogonal transform at the $2^n$-th order in the vertical direction and by infra-frame processing or by uni-directional prediction using other encoded specific frames, to reproduce a moving picture signal for each progressively scanned frame. A predictive error signal of frames or fields of the bit streams other than the specific frames is decoded by inverse orthogonal transform at the $2^{n-1}$-th order in the vertical direction. The frames or fields of the moving picture signal other than the specific frames are predicted by using a preceding reference frame and/or an upcoming reference frame, to reproduce a moving picture signal.

7 Claims, 4 Drawing Sheets

APPARATUS AND METHOD OF ENCODING/DECODING MOVING PICTURE USING SECOND ENCODER/DECODER TO TRANSFORM PREDICTIVE ERROR SIGNAL FOR EACH FIELD

BACKGROUND OF THE INVENTION

The present invention relates to highly efficient encoding of analog video signals to digital data carrying a less amount of data for effident data transfer, storage and displaying. More specifically, this invention relates to encoding of interlaced moving picture signals with bidirectional inter-picture prediction.

Highly efficient encoding of moving pictures with inter-picture prediction includes the following three methods:

(1) Encoding independently a specific frame among "m" frames (m being an integer of two or more) entirely without reference to the other frames;

(2) Encoding frames by uni-directional prediction using a preceding specific frame; and (3) Encoding frames by bidirectional prediction using preceding and upcoming specific frames.

These encoding method are disclosed in U.S. Pat. No. Re. 34,965 published on Jun. 13, 1995.

Pictures, or frames to be subjected to this encoding method are of three different picture types, that is, I frames (intra-coded frames), P frames (predictive-coded frames) and B frames (bidirectionally predictive-coded frames). Locally decoded I and P frames are used for interframe prediction, however, B frames are never used as reference frames for prediction.

Interlaced signals are composed of even fields and odd fields. The even and odd fields are displaced from each other by ¹⁄₆₀ sec., or by one scanning line.

MPEG-2 standards, for example, employs a method of encoding for each field by using a plurality of fields as reference fields or a method, a combination of major encoding for each frame and subsidiary encoding for each field. The picture types (I, P and B) in MPEG-2 standards are always decided for each frame. This means that, even in encoding for each field, I and P fields are decided by means of two successive fields.

In any method described above for encoding interlaced signals, prediction is carried out for each field whenever displacement occurs between fields due to the movement of picture. Pictures composed of fields and carried by interlaced signals include many aliasing components. Effective inter-picture prediction thus cannot be carried out. In detail, inter-picture prediction produces relatively many predictive errors even if an object in a picture is just displaced right or left without vertical movement.

SUMMARY OF THE INVENTION

A purpose of the present invention is to provide an apparatus and a method of encoding/decoding moving picture signals that achieve effective inter-picture prediction and discrete cosign transform, and also a storage medium that stores the encoded moving picture signals.

The present invention provides an apparatus for efficiently encoding a moving picture signal. The encoding apparatus includes a first encoder, a predictor and a second encoder. The first encoder encodes progressively scanned specific frames that exist for every predetermined period in a moving picture signal to be encoded by infra-frame processing or by uni-directional prediction using other encoded specific frames and by orthogonal transform at the $2^n$-th (n being an integer) order in a vertical direction. The predictor predicts frames or fields of the moving picture signal other than the specific frames by using a preceding reference frame and/or an upcoming reference frame, thus producing a predictive error signal for each field. And, the second encoder encodes the predictive error signal for each field by orthogonal transform at the $2^{n-1}$-th order in the vertical direction.

Furthermore, the present invention provides an apparatus for efficiently decoding a moving picture signal. The decoding apparatus includes a first decoder, a second decoder and a predictor. The first decoder decodes specific frames that exist for every predetermined period in a moving picture bit stream to be decoded by inverse orthogonal transform at the $2^n$-th (n being an integer) order in a vertical direction and by infra-frame processing or by uni-directional prediction using other encoded specific frames, thus reproducing a moving picture signal for each progressively scanned frame. The second decoder decodes a predictive error signal of frames or fields of the moving picture bit stream other than the specific frames by inverse orthogonal transform at the $2^{n-1}$-th order in the vertical direction. And, the predictor predicts the frames or fields of the moving picture signal other than the specific frames by using a preceding reference frame and/or an upcoming reference frame, thus reproducing a moving picture signal.

Moreover, the present invention provides a method of efficiently encoding a moving picture signal. Progressively scanned frames that exist for every predetermined period in a moving picture signal are encoded by infra-frame processing or by uni-directional prediction using other encoded specific frames and by orthogonal transform at the $2^n$-th (n being an integer) order in a vertical direction. Frames or fields of the moving picture signal other than the specific frames are predicted by using a preceding reference frame and/or an upcoming reference frame, thus producing a predictive signal for each field. And, the predictive signal for each field is encoded by orthogonal transform at the $2^{n-1}$-th order in the vertical direction.

The present invention further provides a method of efficiently decoding a moving picture signal. Specific frames that exist for every predetermined period in a moving picture bit stream are decoded by inverse orthogonal transform at the $2^n$-th (n being an integer) order in a vertical direction and by infra-frame processing or by uni-directional prediction using other encoded specific frames, thus reproducing a moving picture signal for each progressively scanned frame. A predictive error signal of frames or fields of the moving picture bit stream is decoded other than the specific frames by inverse orthogonal transform at the $2^{n-1}$-th order in the vertical direction. And, the frames or fields of the moving picture signal are predicted other than the specific frames by using a preceding reference frame and/or an upcoming reference frame, thus reproducing a moving picture signal.

The present invention also provides a storage medium storing efficiently encoded moving picture bit stream. Alternatively stored in the storage medium are a first bit stream and a second bit stream. The first bit stream has been produced by encoding progressively scanned specific frames that exist for every predetermined period in a moving picture signal to be encoded by infra-frame processing or by uni-directional prediction using other encoded specific frames and by orthogonal transform at the $2^n$-th (n being an integer) order in a vertical direction. And, the second stream has been produced by predicting frames or fields of the moving picture signal other than the specific frames by using a preceding reference frame and/or an upcoming reference frame, thus producing a predictive error signal for each field and encoding the predictive error signal for each field by orthogonal transform at the $2^{n-1}$-th order in the vertical direction.

DETAILED DESCRIPTION OF PREFERRED EMBODIMENTS

Preferred embodiments according to the present invention will be disclosed with reference to the attached drawings.

First Embodiment of Encoding Apparatus

Figure 1:
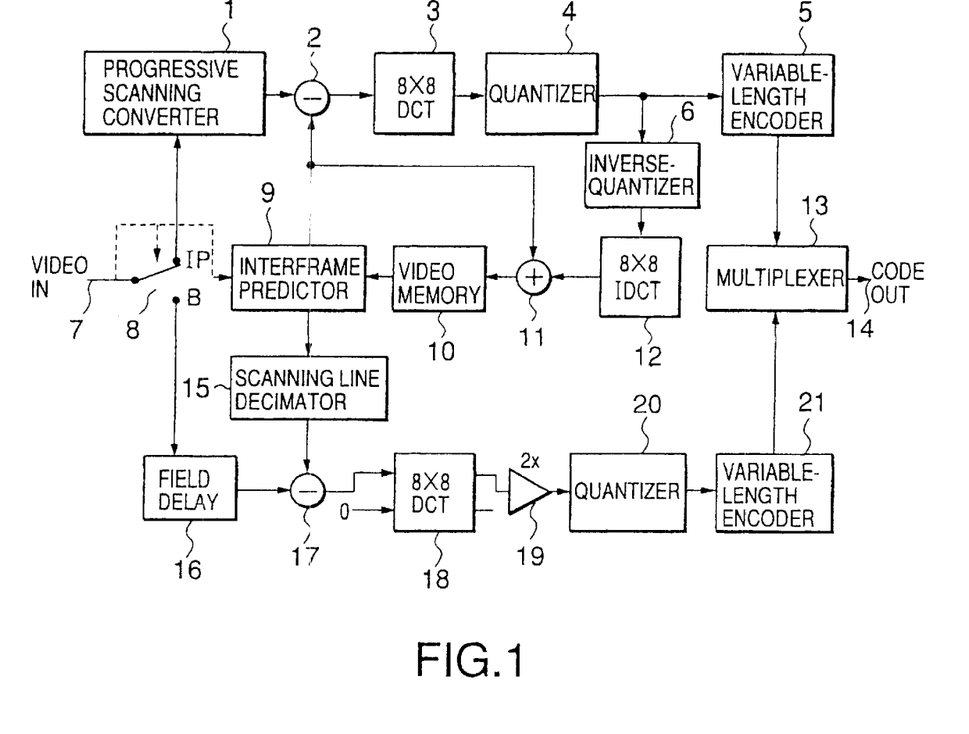
FIG. 1 is a block diagram of the first preferred embodiment of the encoding apparatus according to the present invention.

Shown in FIG. 1 is a block diagram of the first preferred embodiment of the encoding apparatus according to the present invention.

Disclosed first are signals and picture types to be subjected to encoding according to the invention including the first embodiment and also the second embodiment which will be disclosed later.

Signals input to the encoding apparatus according to the present invention are video signals (moving picture signal) of interlaced fields. The picture types I, P and B are decided for each field. This is different from MPEG-2 standards for which the picture types are always decided for each frame.

In the first embodiment, I and P fields only are converted into frames of double density in scanning line by progressive scanning conversion before encoding processing. B fields are processed by the encoding apparatus shown in FIG. 1 as they are, or for each field without progressive scanning line conversion.

On the other hand, In the second embodiment, 1, P and also B fields are converted into frames of double density in scanning line by progressive scanning conversion before encoding processing.

Each picture processed by the progressive scanning conversion are not called "a field" but "a frame" in the present invention in spite of the fact that each picture has originally been composed of one field. In MPEG-2 standards, a frame is composed of two interlaced fields, however, in this invention, a frame is a filed of double density in scanning line by progressive conversion.

Figure 2:
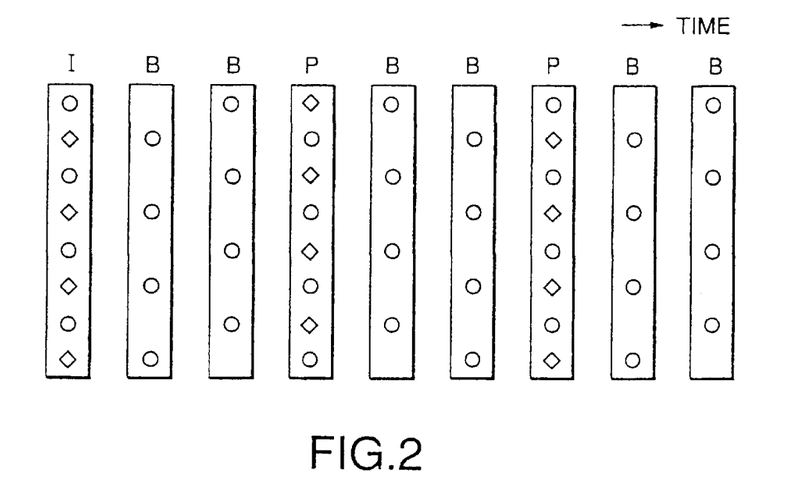
FIG. 2 illustrates pictures types and scanning lines that compose the picture types according to the present invention

Illustrated in FIG. 2 are picture types and scanning lines that compose the pictures I, P and B in the first embodiment. In the figure, the marks "○" and "1" depict the original scanning lines and scanning lines produced by interpolation, respectively.

The I and P frames shown in FIG. 2 are composed by interpolation (progressive scanning conversion) of scanning lines into original I and P fields, respectively. The I and P frames are of double density in scanning line when compared to the original fields. The number of the effective scanning lines for the standard TV broadcasting system are 480 lines for frame pictures and 240 lines for field pictures. The amount of data to be processed for the I and P frames are twice larger than those for the original I and P fields because the number of scanning lines for the frames are twice larger than those for the original fields.

I and P frames in MPEG-2 standards are composed of two interlaced fields. On the contrary, the I and P frames in the present invention are composed by progressive scanning. The present invention thus achieves inter-picture prediction for each frame that is simpler than conventional inter-picture prediction of I and P frames composed of two interlaced fields.

Prediction of B fields in the present invention (the first embodiment) produces predictive signals for each frame because the reference pictures to be used for the prediction are I or P frames. Scanning lines for the predictive signals for each frame are decimated to convert the predictive signals for each frame into predictive signals for each field for prediction of the B fields.

Entire Operation

The operation of the encoding apparatus (the first embodiment) shown in FIG. 1 is now disclosed.

A video signal of interlaced fields is input through an input terminal 7. A switch 8 switches the interlaced fields such that one I or P field for every m-th field is supplied to a progressive scanning converter 1, and the other B fields are supplied to a field delay unit 16. The switch 8 counts field numbers in synchronism with the input signal.

The letter "m" expresses an integer of two or more, preferably, in the range from 3 to 6 that are larger than 2 or 3 for conventional encoding of interlaced signals. Conventionally, interlaced signals that are subjected to prediction are I, P and B frames that appear for every ⅓₀ sec. On the contrary, in this invention, interlaced signals that are subjected to prediction are I, P and B fields that appear for every ⅙₀ sec. This means that, even if "m" is set to 2 or 3 the same as the conventional encoding, the period for inter-picture prediction according to the present invention is ½ of that for the conventional encoding. The period for inter-picture prediction in the invention will thus not be long even if a large "m" is set.

The progressive scanning converter 1 is disclosed, for example, in U.S. Pat. No. 5,619,273 published on Apr. 18, 1997. The converter 1 carries out motion compensation of I and P fields for each small block by using preceding and upcoming fields and interpolation of scanning lines into the fields to produce I and P frames, the scanning lines having been decimated by interlaced scanning. The resultant number of scanning lines for each field becomes twice larger (double density) than the original scanning lines. In other words, one field processed by the converter 1 corresponds to a frame composed by progressive scanning. The preceding and upcoming fields are supplied to the converter 1 for the motion compensation.

The video signal output from the progressive scanning converter 1, the number of scanning lines of which is twice larger than the original scanning lines, is supplied to a subtractor 2. Also supplied to the subtractor 2 is an interframe predictive signal from an interframe predictor 9. The predictive signal is subtracted from the video signal to produce an interframe predictive error signal.

The interframe predictive error signal is supplied to a discrete cosine transformer (DCT) 3. The DCT 3 transforms the predictive error signal into coefficients for each 8×8 block by discrete cosign transform (also abbreviated to DCT), or orthogonal transform at the $2^n$-th order in the vertical direction. The letter "n" expresses an integer, and it is three in this embodiment. The coefficients are supplied to a quantizer 4 and then quanitzed by a predetermined stepsize to be converted into fixed-length coefficients.

The fixed-length coefficients are supplied to a variable-length encoder 5 and an inverse-quantizer 6.

The variable-length encoder 5 arranges the two-dimensional 8×8 blocks of fixed-length coefficients to one-dimensional variable-length coefficients by the zigzag scanning order.

The functions of the subtractor 2, DCT 3, quantizer 4 and variable-length encoder 5 are basically the same as those of a conventional subtractor, DCT, quantizer and variable-length encoder for encoding frames each composed of two interlaced fields. As already described, a frame composed of two interlaced fields appears for every 1/30 sec. On the contrary, a frame to be processed in this invention is composed by interpolating scanning lines into a field that appears for every 1/60 sec., that is, a frame in the invention also appears for every 1/60 sec. Therefore, for complete real time processing, the subtractor 2, DCT 3, quantizer 4 and variable-length encoder 5 thus require the processing speed that is two times higher than the conventional counterparts.

The fixed-length coefficients supplied to the inverse-quantizer 6 are processed and supplied to an inverse discrete cosigne transformer (IDCT) 12. The, IDCT 12 inversely transforms the inversely quantized coefficients for each 8×8 block to reproduce the interframe predictive error signal. The reproduced predictive error signal is supplied to an adder 11. The adder 11 adds the interframe predictive error signal and the interframe predictive signal supplied from the interframe predictor 9 to reproduce the video signal. The reproduced video signal is stored in a video memory 10.

The functions of the inverse-quantizer 6, IDCT 12 and adder 11 for locally decoding the video signal are basically the same as those of a conventional inverse-quantizer, IDCT and adder for decoding video signals each composed of two interlaced fields.

For complete real time processing, the inverse-quantizer 6, IDCT 12, adder 11 and video memory 10 also require the processing speed that is two times higher than the conventional counterparts. Storage capacity for the video memory 10 is the same as that for a conventional video memory. Because the conventional video memory requires the storage capacity of two interlaced fields to store one frame, and the video memory 10 in the invention stores one frame composed by progressive scanning as already described.

The video signal stored in the video memory 10 is supplied to the interframe predictor 9. The predictor 9 carries out prediction of a frame composed by progressive scanning in synchronism with the input interlaced signal. This prediction is simpler than that of a conventional predictor for predicting a frame composed of two interlaced fields.

The interframe predictor 9 detects motion vectors of a frame for each pixel block in the range of 16×16 to 8×8, and carries out motion compensation of the frame in accordance with the detected motion vectors to produce the interframe predictive signal. The accuracy of the motion compensation is preferably ½ pixel.

Next, a B field supplied to the field delay unit 16 is delayed for each field by a period corresponding to (m−1) fields. The delay unit 16 also compensates for the delay caused by the scanning line interpolation carried out by the progressive scanning converter 1.

The delayed B field is supplied to a subtractor 17. Also supplied to the subtractor 17 is an interfield predictive signal from a scanning line decimator 15. The decimator 15 produces the interfield predictive signal by decimating scanning lines of the interframe predictive signal supplied from the interframe predictor 9. The interfield predictive signal supplied to the subtractor 17 is subtracted from the video signal of the delayed B field to produce an interfield predictive error signal. The interfield predictive error signal is supplied to a DCT 18 and then supplied to a multiplier 19. DCT The functions of the DCT 18 and multiplier 19 are disclosed in detail.

The DCT 18 and multiplier 19 carry out DCT for each 8×4 block of the interfield predictive error signal for each field. Processing a B field for each 8×8 block the same as an I or a P frame causes the block becoming double in size in the vertical direction, thus being not advantageous in consideration of adaptive quantization and visual characteristics, etc. Because the number (density) of scanning lines for a B field is half that for an I or a P frame, while the number of scanning lines in each 8×8 block of one B field is the same as that in each 8×8 block of one I or P field. Furthermore, the number of blocks for one B field is half that for one I or P frame, thus processing a B field for each 8×8 block having difficulty in rate control.

However, the DCT 18 processes each 8×4 block of a B field of the interfield predictive error signal, that is, two-dimensional DCT at the fourth ($2^{n-1}$-th, n being three) order in the vertical direction, resulting the same size on screen as that for processing each 8×8 block. In assembling the encoding apparatus shown in FIG. 1, thanks to the better design environment for DCTs for 8×8 blocks,. one DCT for 8×8 blocks is preferably provided for performing the functions of both DCTs3 and 18. In other words, one DCT works on both 8×8 and 8×4 blocks.

There are two methods for processing each 8×4 block of a B field of the interfield predictive error signal as illustrated in FIGS. 3A to 3D. The number of coefficients to be subjected to quantization and encoding is 8×4 for each block in both two methods for generating less redundant codes.
Method I This method employs the basis vectors for DCT for 8×8 block that is also used by DCT for 8×4 block, maintaining orthogonality and achieving complete inverse transform.

Figure 3A:
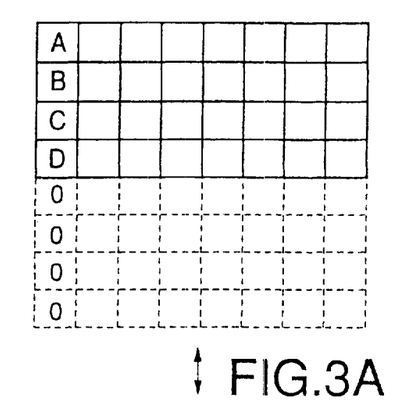
FIGS. 3A to 3D illustrate methods of discrete cosign transform of each 8×4 block of a B field of an interfield predictive error signal according to the present invention.

As shown in FIG. 3A, the DCT 18 inputs pixel values for four scanning lines in each 8×4 block, that is, a half of an 8×8 block in the frequency band, of the inrerfield predictive error signal. The DCT 18 also inputs the values "O" in the other 8×4 block that is the later half of the 8×8 block.

Figure 3B:
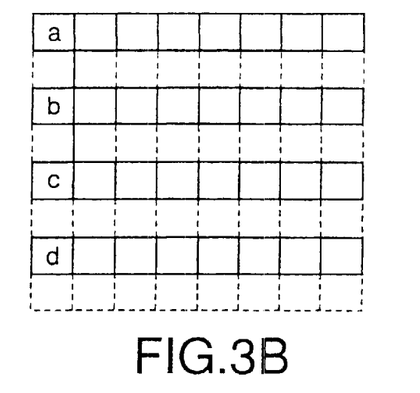
Figure 3C:
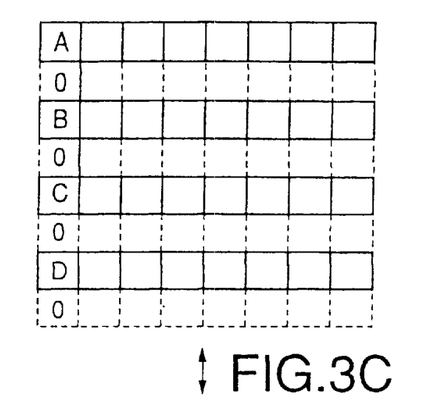
Figure 3D:
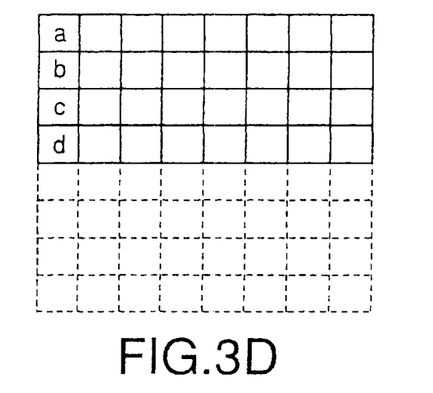

All the coefficients (0, 1, 2, . . . , and 7) are generated by DCT. However, as shown in FIG. 3B, the odd numbered coefficients (1, 3, 5 and 7) are neglected and the effective even numbered coefficients (0, 2, 4 and 6) are output. The output coefficients are the same as those produced by DCT of 8×4 block. The gain in the coefficients is however different from that by DCT of 8×4 block. The coefficients are thus multiplied by two by the multiplier 19 for gain adjustment.
Method II This method is to neglect the high frequency components of each 8×8 block, achieving effective decoding of P pictures. As shown in FIG. 3C, the DCT 18 inputs the values "O" for scanning lines that have been decimated by interlaced scanning to produce eight lines. The DCT 18 carries out DCT for each 8×8 block composed of the produced eight lines. The high frequency coefficients are neglected as shown in FIG. 3D because they are generated as aliasing components. The remaining coefficients are multiplied by two by the multiplier 19 for gain adjustment for the same reason mentioned in the method I.

The method I is preferable than the method II because the latter is not a complete orthogonal transform and thus the inverse transform will produce errors.

The multiplier 19 for gain adjustment may be omitted by inputting the same signal for each pair of two succeeding scanning lines by the DCT 18 to compose an 8×8 block, besides the methods I and II.

Quantization and Variable-length Encoding

The coefficients for each 8×4 block of a B field of the interfield predictive error signal are supplied to a quantizer 20. The stepsize of the quantizer 20 is determined in accordance with the coefficients. The weighting values for each 8×8 block are determined in accordance with the remaining coefficients shown in FIG. 3B or 3D. The coefficients of a B field is quantized by the quantizer 20 by about 50% coarse than that for an I or a P frame even though the quantized values of a gain-adjusted B field can be basically handled the same as an I or P frame. Because a B field cannot be used as a reference field like an I or a P frame.

Figure 4A:
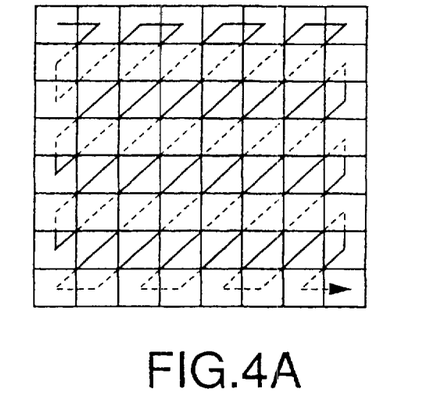
FIGS. 4A and 4B illustrate methods of the zigzag scanning order according to the present invention.
Figure 4B:
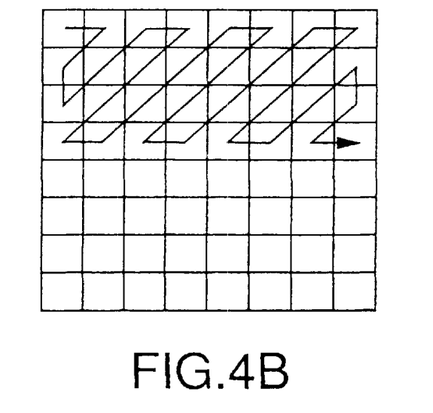

The coefficients quantized by the quantizer 20 are supplied to a variable-length encoder 21. The encoder 21 first arranges the coefficients according to the zigzag scanning order. Two methods of the zigzag scanning order are illustrated in FIGS. 4A and 4B. FIG. 4A shows the method of skipping the components corresponding to the coefficients that have been neglected by the method I (FIG. 3B) in each 8×8 block. On the other hand, FIG. 4B shows the other method of zigzag scanning only in each 8×4 block that has remained by the method II (FIG. 3D).

The variable-length encoder 21 then encodes the coefficients arranged according to the zigzag scanning order by using variable-length codes to produce variable-length coefficients.

For efficient encoding, the variable-length codes to be used for encoding the coefficients are of any type suitable for 8×4 blocks. Because the variable-length codes do not have zero-run length longer than 32 (=8×4) that is the number of coefficients for each 8×4 block. However, for cost reduction, the variable-length codes the same as those for 8×8 blocks may be used. Because such a long zero-run length is rarely generated even for 8×8 blocks.

The variable-length coefficients of the interframe predictive error signal for I or P frames output by the encoder 5 and also those of the interfield predictive error signal for B fields output by the encoder 21 are supplied to a multiplexer 13.

The multiplexer 13 multiplexes these variable-length coefficients into a bit stream of the predictive error signal composed of I and P frames, and B fields. The order of the frames and fields in the bit stream is such that I and P frames precede B fields. This is the reverse order of the input signal shown in FIG. 2.

Second Embodiment of Encoding Apparatus

Figure 5:
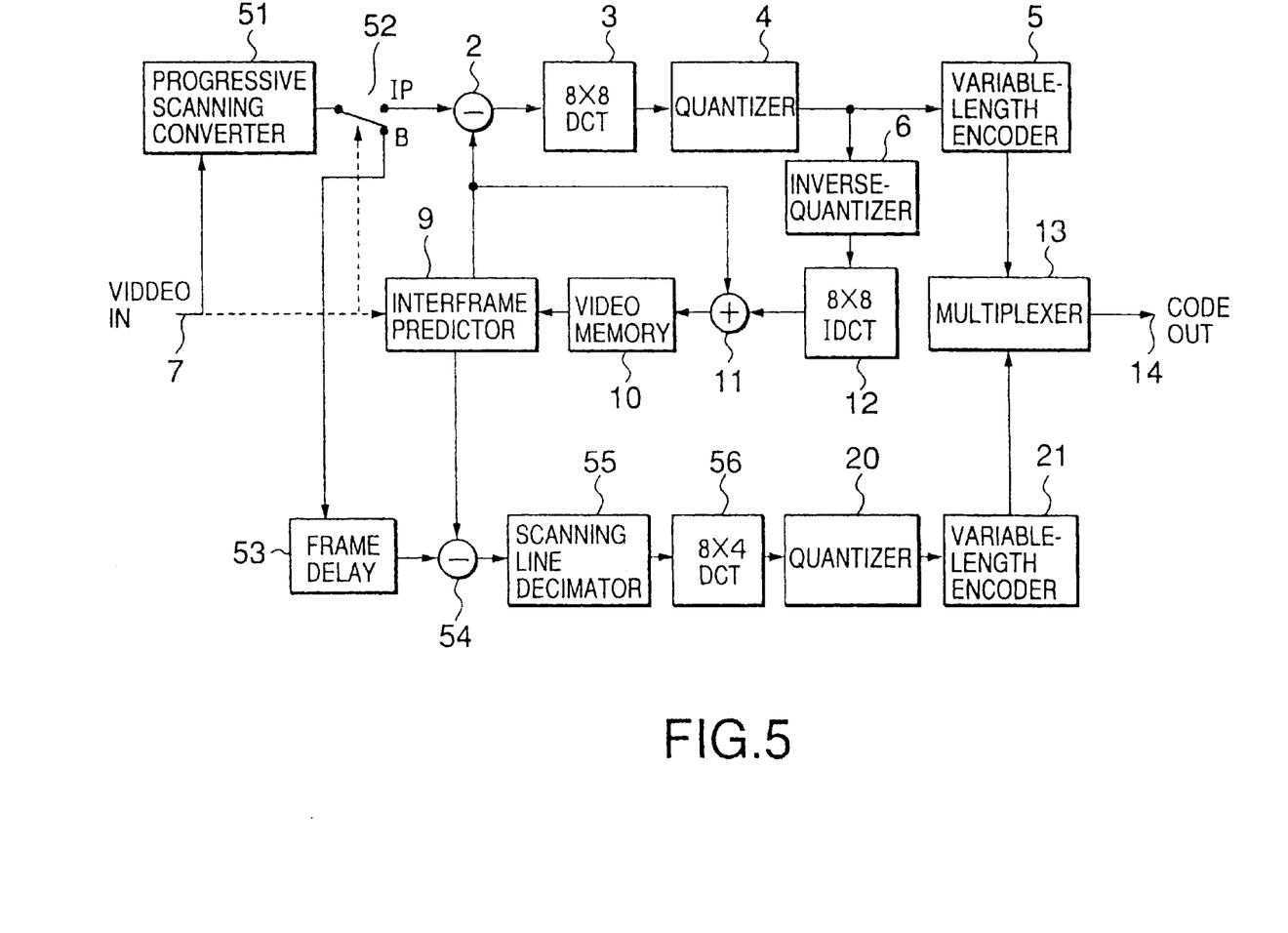
FIG. 5 is a block diagram of the second preferred embodiment of the encoding apparatus according to the present invention.

Shown in FIG. 5 is a block diagram of the second preferred embodiment of the encoding apparatus according to the present invention. Elements in the second embodiment that are the same as or analogous to the elements in the first embodiment are referenced by the same reference numerals and will not be disclosed in detail.

A signal input to the encoding apparatus shown in FIG. 5 is a video signal of interlaced fields, the same as the first embodiment.

In the first embodiment of FIG. 1, supplied to the progressive scanning converter 1 are I and P fields only. On the contrary, in the second embodiment of FIG. 5, all I, P and B fields of an interlaced video signal are supplied to a progressive scanning converter 51. The converter 51 carries out motion compensation of the fields for each small block by using preceding and upcoming fields and interpolation (progressive scanning) of scanning lines into the fields that have been decimated by interlaced scanning, thus producing I, P and B frames.

The produced frames are supplied to a switch 52. The switch 52 switches the frames such that one I or P frame for every m-th frame (m being an integer of two or more) is supplied to the subtractor 2, and the other B frames are supplied to a frame delay unit 53. B frames supplied to the frame delay unit 53 are delayed for each frame by a period corresponding to (m−1) frames.

The delayed B frames are supplied to a subtractor 54. Also supplied to the subtractor 54 is an interframe predictive signal from the interframe predictor 9. The interframe predictive signal is subtracted from each B frame of the video signal to produce an interframe predictive error signal.

Scanning lines of the interframe predictive error signal that have been interpolated by the scanning line converter 51 are decimated by a scanning line decimator 55 to produce an interfield predictive error signal of a B field. The interfield predictive error signal is then supplied to a DCT 56. The DCT 56 carries out DCT for each 8×4 block of the interfield predictive error signal. Instead, the DCT 56 may carry out DCT for each 8×8 block of the predictive error signal the same as the DCT 18 of FIG. 1.

The remaining processing carried out by the elements in FIG. 5 that are the same as or analogous to the elements in FIG. 1 and referenced by the same reference numerals are basically the same as those carried out by the apparatus of FIG. 1 and hence will not be disclosed.

A difference of the second embodiment from the first embodiment is that, in FIG. 5, the scanning line converter 51 is located in front of the switch 52, to process all I, P and B fields. Another difference is that the scanning line decimator 55 processes a predictive error signal not a predictive signal that is processed, for example, by the scanning line converter 15 of FIG. 1.

This means that, in FIG. 5, the interframe processing is carried out for video signal composed by progressing scanning. The amount of data to be processed by in the second embodiment thus increases compared to the first embodiment.

However, the entire circuitry for the second embodiment becomes simpler than that for the first embodiment because the interframe processing is carried out for video signal composed by progressing scanning. The amount of components for assembling the scanning line converter 1 for processing I and P fields and the converter 51 for processing I, P and B fields shown in FIGS. 1 and 5, respectively, are almost the same. The converter 1 is provided with circuitry for processing all the I, P and B fields. However, the converter 1 processes I and P fields only, and stops the processing whenever B fields are input to the switch 8 in FIG. 1.

Embodiment of Decoding Apparatus

Figure 6:
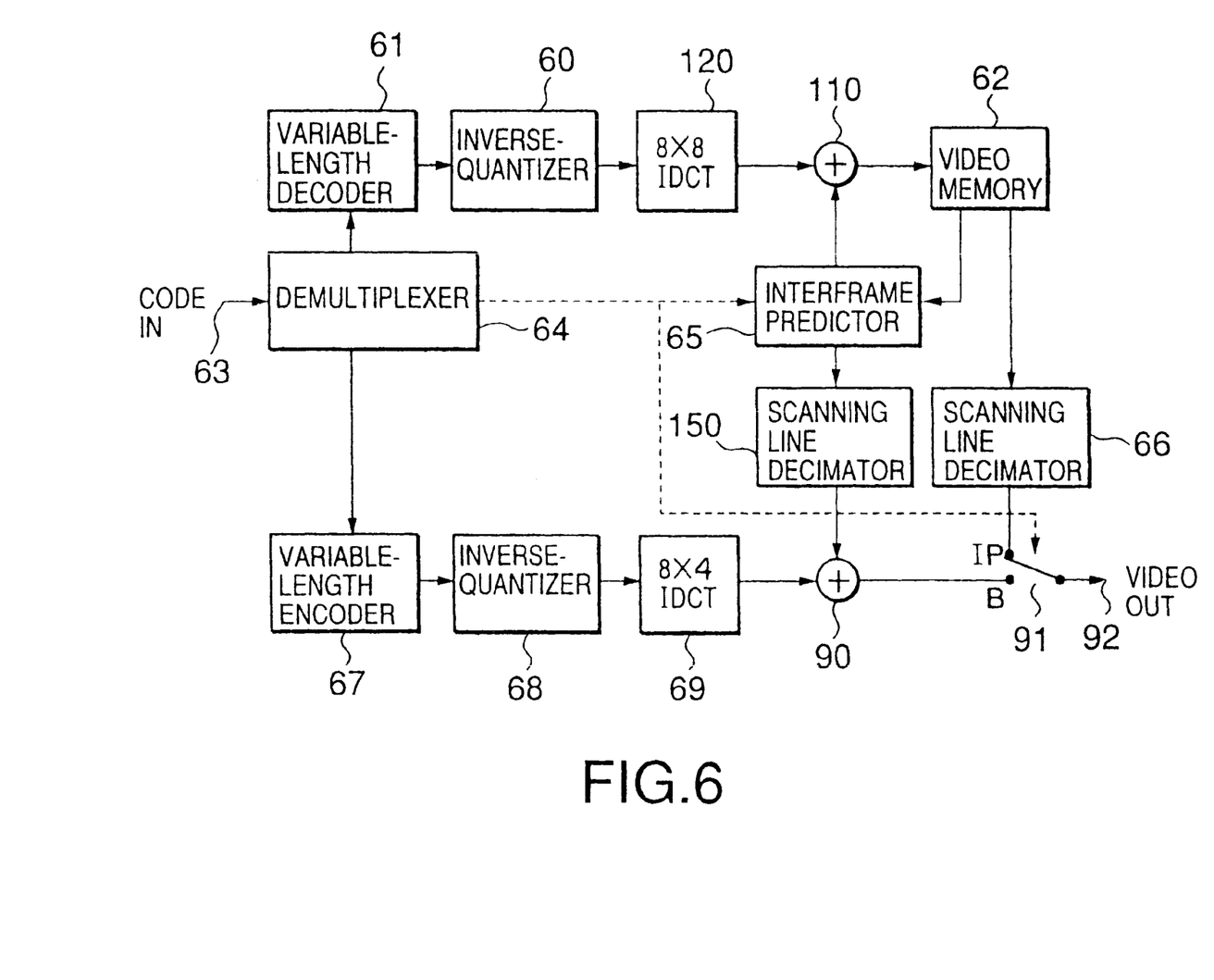
FIG. 6 is a block diagram of a preferred embodiment of the decoding apparatus according to the present invention.

Shown in FIG. 6 is a block diagram of a preferred embodiment of the decoding apparatus according to the present invention. The decoding apparatus is to decode signals that have been encoded by encoding apparatus, such as, shown in FIG. 1 or 5.

A bit stream of a predictive error signal composed of I and P frames, and B fields that have been encoded, for example, by the encoding apparatus of FIG. 1, is supplied to a demultiplexer 64 through an input terminal 63. The demultiplexer 64 demultiplexes the bit stream into a bit stream of I and P frames, and another bit stream of B fields.

The bit stream of I and P frames is supplied to a variable-length decoder 61 and reconverted into fixed-length codes. The fixed-length codes are supplied to an inverse-quantizer 60 and then to an IDCT 120. The IDCT 120 inversely transforms for each 8×8 block the inversely quantized fixed-length codes to reproduce the predictive error signal. The reproduced predictive error signal is supplied to an adder 110 and added to a predictive signal supplied from an interframe predictor 65 to reproduce the video signal.

The functions of the inverse-quantizer 60, IDCT 120 and adder 110 are the same as those of the inverse-quantizer 6, IDCT 12 and adder 11 shown in FIG. 1. The decoding processing requires 1/60 sec., for each frame for complete real time processing.

The reproduced video signal is once stored in a video memory 62 and supplied to the interframe predictor 65 and also a scanning line decimator 66.

The interframe predictor 65 produces a predictive signal by using the stored video signal in synchronism with the input bit stream. The predictive signal is supplied to the adder 110 for I and P frames, whereas to a scanning line decimator 150 for B fields. The decimator 150 decimates scanning lines from the predictive signal.

Compared to the predictor 9 of FIG. 1, the predictor 65 processes the video signal for each frame in synchronism with the input bit stream with no requirement of motion vector detection and prediction mode setting, thus achieving markedly small circuitry.

The input bit stream of B frames are supplied to a variable-length decoder 67, an inverse-quantizer 68 and then an IDCT 69 to be reconverted into the predictive error signal. The functions of the variable-length decoder 67, an inverse-quantizer 68 are the inverse of those of the variable-length encoder 21 and quantizer 20, respectively, shown in FIG. 1.

The predictive error signal for each field obtained by the IDCT 69 for inverse transform of 8×4 block is supplied to an adder 90. Also supplied to the adder 90 is the predictive signal for each field supplied from the scanning line decimator 150. The predictive error signal is added to the predictive signal to reproduce the video signal of B fields. The reproduced video signal of B fields is supplied to a switch 91.

Scanning lines of the video signal of I and P frames are decimated by the scanning line decimator 66 to reproduce the video signal of I and P fields. The reproduced video signal of I and P fields is also supplied to the switch 91.

The switch 91 outputs the video signals of I, P and B fields through an output terminal 92 in synchronism with the input bit stream in the original (before encoded) picture order, such as shown in FIG. 2, not in the input order to the decoding apparatus.

The scanning line decimators 66 and 150 decimate scanning lines from each frame of the progressive video signal to produce the video signal of interlaced fields. These decimators do not require pre-filtering that is needed for subsampling, for processing the progressive signal that has originally (before encoded) been the interlaced video signal. Because the reproduced progressive frames are signals that have originally been produced by progressive scanning conversion of the interlaced signal by the encoding apparatus, and hence the vertical frequency characteristics of the reproduced frames are adequately restricted as the interlaced signal.

IDCT

The IDCT 12 for 8×8 block in FIG. 1 or 5 can be used as the IDCT 69 for 8 10×4 block. The IDCT processing depends on the encoding method, that is, the method I or 11 as already described with respect to the DCT 18 for 8×8 block and multiplier 19 shown in FIG. 1.

When the method I has been used for encoding, the IDCT 69 inputs the values "O" for the odd coefficients that have been neglected in encoding, to produce two symmetrical 8×4 blocks by IDCT. One of the 8×4 blocks is then neglected.

On the other hand, when the method II has been used for encoding, the IDCT 69 inputs the values "o" for the high frequency coefficients that have been neglected in encoding, to produce 8×8 blocks by IDCT under progressive scanning. Scanning lines of the 8×8 blocks are then decimated to produce 8×4 blocks.

Progressive Reproduction

The decoding apparatus of FIG. 6 may output a progressive video signal by using a progressive predictive error signal with no scanning line decimation by the decimators 66 and 150.

When the method I has been used for encoding, the progressive predictive error signal is obtained by interpolating scanning lines into values of four lines of each field in consideration of the relationship between even and odd fields to produce eight progressive scanning lines. This is because the input signal does not include information on whether the original (before encoded) signal includes an even or odd field.

On the other hand, when the method II has been used for encoding, the progressive predictive error signal is obtained by inputting 8×4 coefficients to the low frequency band of each 8×8 block and also inputting the values "0" to the high frequency band thereof corresponding to an 8×4 block. The 8×8 block is then transformed by IDCT to produce interpolated eight scanning lines for the progressive predictive error signal. The relationship between even and odd fields of the progressive predictive error signal corresponds to that for the original video signal. This is because the input signal includes information on whether the original before encoded) signal includes an ever or odd field. However, since the method II is not an orthogonal transform, this method produces errors.

Furthermore, the progressive predictive error signal may be produced by IDCT for each 8×8 block of the DCT coefficients obtained by the method 1, resulting in displacement by ½ line only.

Storage Medium

The bit stream obtained by the encoding apparatus shown in FIG. 1 or 5 can be multiplexed with a bit stream of audio and control data, etc., under MPEG system standards. The multiplexed bit stream is added with error correction codes and then modulated. The modulated bit stream that has been encoded efficiently is then stored in a storage medium. When a storage medium is a read-only type, the bit stream can be rapidly stored by a stamper, etc.

In detail, alternatively stored in the storage medium are a first bit stream and a second bit stream.

The first bit stream has been produced by encoding progressively scanned specific frames that exist for every predetermined period in a moving picture signal. The specific frames have been encoded by infra-frame processing or by uni-directional prediction using other encoded specific frames. The specific frames have also been orthogonally transformed at the $2^n$-th (n being an integer) order in the vertical direction.

On the other hand, the second stream has been produced by predicting frames or fields of the moving picture signal other than the specific frames by using preceding and upcoming reference frames, to produce a predictive error signal for each field, the predictive error signal having been encoded by orthogonal transform at the $2^{n-1}$-th order in the vertical direction.

As described above, according to the present invention, one specific field for every m-th (m being an integer of two or more) field of an interlaced video signal is converted into a progressively scanned specific frame. The specific frame is encoded/decoded with intra-frame processing or by uni-directional prediction using other encoded specific frames and DCT for each 8×8 block. On the other hand, other fields are encoded/decoded with bidirectional prediction by using preceding and upcoming specific frames and DCT for each 8×4 block.

The present invention employs bidirectional prediction using progressively scanned frames as reference pictures. Different from interlaced pictures, progressively scanned pictures exhibit no displacement in time and no aliasing components due to the fact that progressively scanned pictures satisfy the sampling theorem. Therefore, the present invention achieves highly effective motion compensation-predictive encoding.

The intraframe encoding employed in the present invention also exhibits no displacement in time and no aliasing components. The reference pictures used in the invention are always frames the density in scanning line thereof is twice that for fields. Motion compensation of frames is thus twice accurate in motion vector in the vertical direction.

The letter "m" for converting one field for every m-th field of an interlaced video signal into a progressively scanned frame expresses an integer of two or more, preferably, in the range from 3 to 6 that are larger than 2 or 3 for conventional encoding of interlaced signals.

When "m" is set to 2 or 3, the period for interfield prediction according to the present invention will be ½ of that of the conventional encoding of interlaced signals. The present invention thus achieves production of less predictive errors.

On the other hand, when "m" is set to 4 (2×2) or 6 (2×3) so that the period for interfield prediction according to the present invention is the same as the conventional encoding of interlaced signals, B frames more than the conventional encoding will be generated. The amount of codes for each B frame is less than that for a P frame by bidirectional prediction. The present invention thus achieves generation of less total amount of codes.

Furthermore, in the present invention, progressively scanned frames are transformed by DCT for each 8×8 block, whereas other fields are transformed by DCT for each 8×4 block, thus the block size on screen being constant and the number of blocks on screen being the same for the frames and fields. Adaptive quantization and rate control are also the same for the frames and fields. The present invention thus has less visual problems.

DCT for 8×4 blocks can be achieved by DCT for 8×8 blocks as already described. The present invention thus achieves a share in DCT circuitry for progressive frames and other fields.

The present invention further achieves storage of signals encoded by the encoding apparatus in a storage medium with less total amount of codes and high efficiency.

What is claimed is:

1. An apparatus for efficiently encoding a moving picture signal, comprising:

a first encoder to encode progressively scanned specific frames that exit for every predetermined period in a moving picture signal to be encoded by intra-frame processing or by uni-directional prediction using other encoded specific frames and by orthogonal transform at the $2^n$-th (n being an integer) order in a vertical direction for a specific number of blocks of each of the specific frames having a specific number of scanning lines;

a predictor to predict a field of an interlaced picture having scanning lines that is half the specific number of scanning lines of the moving picture signal other than the specific frames by using a preceding progressively scanned reference frame and/or an upcoming progressively scanned reference frame, each of the reference frames having the specific number of scanning lines, thus producing a predictive error signal for the field; and a second encoder to encode the predictive error signal for the field by orthogonal transform at the $2^{n-1}$-th order in the vertical direction for each of a specific number of blocks of the field.

2. The apparatus according to claim 1, wherein the second encoder carries out the orthogonal transform at the $2^{n-1}$-th order in the vertical direction by orthogonal transform at the $2^n$-th order in the vertical direction of each pixel block of the moving picture signal in such a way that specific data are input to a half of each block and a half of coefficients produced by the orthogonal transform at the $2^n$-th order in the vertical direction are neglected.

3. An apparatus for efficiently decoding a moving picture signal, comprising:

a first decoder to decode specific frames that exist for every predetermined period in a moving picture bit stream to be decoded by inverse orthogonal transform at the $2^n$-th (n being an integer) order in a vertical direction for a specific number of blocks or each of the specific frames having a specific number of scanning lines and intra-frame processing or by uni-directional prediction using other encoded specific frames, thus reproducing and moving picture signal for each progressively scanned frame;

a second decoder to decode a predictive error signal of a field of an interlaced picture having scanning lines that is half the specific number of scanning lines of the moving picture bit stream other than the specific frames by inverse orthogonal transform at the $2^{n-1}$-th order in the vertical direction for each of a specific number of blocks of the field; and a predictor to predict the field of the moving picture signal other than the specific frames by using a preceding progressively scanned reference frame and/or an upcoming progressively scanned reference frame, each of the reference frames having the specific number of scanning lines, thus reproducing a moving picture signal.

4. The apparatus according to claim 3, wherein the second decoder carries out the inverse orthogonal transform at the $2^{n-1}$-th order in the vertical direction by inverse orthogonal transform at the $2^n$-th order in the vertical direction of each pixel block of the predictive error signal in the vertical direction in such a way that specific data are input to a half of each block and a half of coefficients produced by the inverse orthogonal transform at the $2^n$-th order in the vertical direction are neglected.

5. A method of efficiently encoding a moving picture signal, the method comprising the step of:

encoding progressively scanned specific frames that exist for every predetermined period in a moving picture signal to be encoded, by intra-frame processing or by uni-directional prediction using other encoded specific frames and by orthogonal transform at the $2^n$-th (n being an integer) order in a vertical direction for a specific number or blocks of each of the specific frames having a specific number of scanning lines;

predicting a field of an interlaced pictures having scanning lines that is half the specific number of scanning lines of the moving picture signal other than the specific frame by using a preceding progressively scanned reference frame and/or an upcoming progressively scanned reference frame, each of the reference frames having the specific number of scanning lines, thus producing a predictive signal for the field; and encoding the predictive signal for the field by orthogonal transform at the $2^{n-1}$-th order in the vertical direction for each of a specific number of blocks of the field.

6. A method of efficiently decoding a moving picture signal, the method comprising the steps of:

decoding specific frames that exist for every predetermined period in a moving picture bit stream to be decoded by inverse orthogonal transform, at the $2^n$-th (n being an integer) order in a vertical direction for a specific number or blocks of each of the specific frames having a specific number of scanning lines and by intra-frame processing or by uni-directional prediction using other encoded specific frames, thus reproducing a moving picture signal for each progressively scanned frame;

decoding a predictive error signal of a field of an interlaced pictures having scanning lines that is half the specific number of scanning lines of the moving picture bit stream other than the specific frames by inverse orthogonal transform at the $2^{n-1}$-th order in the vertical direction for each of a specific number of blocks of the field; and predicting the field of the moving picture signal other than the specific frames by using a preceding progressively scanned reference frame and/or an upcoming progressively scanned reference frame, each of the reference frames having the specific number or scanning lines, thus reproducing a moving picture signal.

7. A storage medium storing efficiently encoded moving picture bit stream, comprising:

a first bit stream produced by encoding progressively scanned specific frames that exist for every predetermined period in a moving picture signal to be encoded by intra-frame processing or by uni-directional prediction using other encoded specific frames and by orthogonal transform at the $2^n$-th (n being an integer) order in a vertical direction for a specific number of blocks of each of the specific frames having a specific number of scanning lines; and a second stream produced by predicting a field of an interlaced picture having scanning lines that is half the specific number of scanning lines of the moving picture signal other than the specific frames by using a preceding progressively scanned reference frame and/or an upcoming progressively scanned reference frame, each of the reference frames having the specific number of scanning lines, thus producing a predictive error signal for the field and encoding the predictive error signal for the field by orthogonal transform at the $2^{n-1}$-th order in the vertical direction for each of a specific number of blocks of the field, the first and second bit streams being alternatively stored in the storage medium.

* * * * *